United States Patent [19]
Greene

[11] Patent Number: 5,938,993
[45] Date of Patent: Aug. 17, 1999

[54] PROCESS FOR MAKING MOLDED POLYURETHANE ARTICLES

[76] Inventor: Steven R. Greene, 10753 SW. 110th St., Dunnellon, Fla. 34432

[21] Appl. No.: 08/861,375

[22] Filed: May 21, 1997

[51] Int. Cl.$^6$ .............................. B29C 44/06; B29C 44/12
[52] U.S. Cl. ..................... 264/46.4; 264/46.6; 264/255; 264/309; 425/812
[58] Field of Search ................................. 264/129, 46.4, 264/46.6, 309, 255; 425/812

[56] References Cited

U.S. PATENT DOCUMENTS

| | | | |
|---|---|---|---|
| 4,389,454 | 6/1983 | Horacek et al. | 264/255 |
| 5,116,557 | 5/1992 | Debaes et al. | 264/46.6 |
| 5,580,501 | 12/1996 | Gallagher et al. | 264/255 |
| 5,653,923 | 8/1997 | Spoo et al. | 264/129 |
| 5,662,996 | 9/1997 | Jourquin et al. | 264/46.4 |

*Primary Examiner*—Allan R. Kuhns
*Attorney, Agent, or Firm*—Saliwanchik, Lloyd & Saliwanchik

[57] ABSTRACT

The subject invention pertains to unique methods for producing articles with a polyurethane integral skin at low cost. The methods of the subject invention permit the production of highly detailed painted articles having an outer polyurethane layer and an inner polyurethane foam structure, wherein the outer layer is waterproof. The subject invention further pertains to the articles produced by the methods of the subject invention.

17 Claims, 6 Drawing Sheets

PROCESS FOR MAKING MOLDED POLYURETHANE ARTICLES

BACKGROUND OF THE INVENTION

Polyurethanes are a class of polymers used extensively in the preparation of a large variety of products. Polyurethanes have a wide range of physical properties. The properties of a particular polyurethane will depend upon the exact chemical composition of the polyurethane polymer. Some polyurethanes are soft and spongy, while others are rigid.

Many situations call for an object with structural integrity, a waterproof covering, and/or detailed features on the surface of the object. For example, for the comfort of the passengers, seats on marine vehicles need a cushion portion wherein the cushion portion often needs a waterproof covering, some inner structure, detailed features such as emblems, and some means for attaching the cushion to the seat frame. These cushions are often assembled by covering a piece of cushiony material, for example foam, with a piece of vinyl or leather. If an emblem is desired, it is often stitched onto the covering, creating holes in the covering. In addition, the vinyl is often stapled, screwed, or glued to the structure of the seat which is often, for example, made of wood. The exposure of the seat and seat cushion to the moisture encountered in a marine environment can cause, for example, the staples and wood to degrade with time and/or the foam to mildew. This degradation can be due to the moisture penetrating the holes through which the staples punctured the vinyl covering to secure the vinyl covering to the wood.

In many instances, it is advantageous to prepare articles which have a polyurethane layer encapsulating an inner structure, for example, polyurethane foam. Although such polyurethane covered objects are useful for many applications, a frequent problem with such products involves the separation of the seams produced during the manufacturing process. Such separation is particularly common when the product is subjected to high temperatures, changes in temperature, or if the product is exposed to salt water or other harsh conditions. Because polyurethane articles are often used in the automotive and boating industries, separation of seams presents an important limitation to the usefulness of these products.

Currently, the marine and transportation industry typically employ in-house upholstery or outside vendors to make internal parts that act as cushioning or covering for their interiors. This is a very time-consuming and costly process that entails wrapping either a vinyl or leather sheet foam over a wood or plastic base. The material is either glued, stapled, or sewn onto the backing. With time, the wood either dry rots or the vinyl tears and opens the interior to water absorption. This causes the part to require either repair or replacement.

There exists a clear need for a process which can reliably and inexpensively produce a polyurethane object with a waterproof covering, some inner structure, detailed features on the covering, and/or some means for attaching the object to external structures. A procedure which could cost-effectively produce such polyurethane objects is particularly needed.

BRIEF SUMMARY OF THE INVENTION

The practice of the subject invention pertains to the production of low cost but high quality polyurethane articles useful in a wide range of applications. The articles produced according to the unique methods of the subject invention are useful in applications ranging from automotive and boating products to seating products to industrial and household products.

In a preferred embodiment, the articles produced according to the subject invention comprise an integral skin of polyurethane which encapsulates an inner structure comprising, for example, polyurethane foam. The integral skin of an object of the subject invention is formed of at least two sections of polyurethane, referred as first layer, second layer, etc., which meet in such a way as to form seams between adjoining layers of polyurethane. The seams between adjoining layers are formed by physical and chemical contact between the adjoining layers of polyurethane and can be watertight. The methods of the subject invention are particularly advantageous because the individual layers of polyurethane which combine to cover the inner structure adheres to each other in a highly secure manner, providing a waterproof covering. In an embodiment where the inner structure is polyurethane foam, the subject invention forms an interface of the polyurethane layer and the polyurethane foam which resists separation. Advantageously, the subject process can be used to produce painted objects as well as objects having extensive topographic detail.

Typically, an initial step of the method of the subject invention involves the production of a mold, in which a polyurethane layer can then be formed. The mold can be made using standard procedures, known to those skilled in the art, in conjunction with the teachings provided herein. In a preferred embodiment, the mold will have a lid, as described herein, which enables the production of a polyurethane object comprising a strong and reliable seam where the polyurethane layers join.

A preferred embodiment of the subject invention provides specific procedures for forming an article encapsulated by a polyurethane layer. As stated above, an initial step involves the production of a suitable mold. The mold is typically silicone and is made using standard procedures known to those skilled in the art combined with the teachings provided herein. In a specific embodiment, in order to produce the mold, a master part is placed into a frame and liquid silicone is poured around the master part. The frame may be, for example, wood. Once the silicone hardens around the master part, the master part can be removed, thus leaving the silicone mold into which polyurethane can be introduced to make the polyurethane objects of the subject invention.

In a specific embodiment, a first polyurethane layer is deposited in the silicone mold and allowed to harden. In a preferred embodiment, the polyurethane layer is deposited such as to cover the interior surface of the mold, as well as the edge of the mold. In a more preferred embodiment, this first layer is sprayed onto the surface of the mold which defines the size, shape, and topography of at least one side of the object to be produced. In a preferred embodiment, an appropriate amount of polyurethane foam, for example high resilient, can then be deposited into the polyurethane lined mold to provide, for example, a cushiony material for the interior of the object. A lid can be placed over the foam so as to rest on the polyurethane layer lining the edge of the mold. The lid can be held in place by, for example, a press. By way of a chemical reaction, which typically takes from about 5 to 10 minutes, the polyurethane foam rises to fill the cavity created between the polyurethane lined mold and the lid. Once the foam is set, the lid can be removed and a layer, referred to as a second layer, of polyurethane deposited on the surface of the polyurethane foam such as to contact the first layer of polyurethane to form a seam. The seam can be pruned as appropriate.

Alternatively, other materials can be used to provide the inner structure of an object according to the subject invention. Examples of alternative materials include any pourable liquid plastic, bun stock sculpted as necessary, and Ethafoam produced by Dow Chemical. However, any material which provides the desired characteristics can be used.

A further aspect of the subject invention pertains to the production of polyurethane articles with painted surfaces. The painting of these surfaces can be efficiently accomplished by applying a paint layer to the silicone mold prior to the spraying of the first polyurethane layer and applying a paint layer to the second polyurethane layer.

The method of the subject invention makes it possible to provide high quality, low cost interior and exterior parts for the marine transportation, and other industries. The quality of the subject products exceeds current manufacturing standards while offering many cost saving benefits.

In a specific embodiment, the process of the subject invention allows the customized use of color, texture, and hardness of the integral skin, as well as the embedding of mechanical fasteners into the polyurethane object. The embedding of these mechanical fasteners allows for ease of attachment to external structures, thus eliminating any drilling on the production line.

An important aspect of the subject invention is the ability to use soft tooling as opposed to conventional hard or steel tools that are very costly and require months to produce. This is done with, for example, a silicone mold that reproduces even the smallest detail on any master part at a fraction of the cost in a short period of time. However, the subject invention can be practiced with hard or steel tools, for example if the volume of objects to be produced justifies the expense.

The subject process allows for a large quantity of exact replicas of the master part to be produced at a fraction of the labor cost of the matter.

DETAILED DISCLOSURE OF THE INVENTION

The subject invention pertains to unique and advantageous methods for preparing molded articles with an outer polyurethane layer. The polyurethane objects produced by the subject process are also aspects of this invention. In a specific embodiment, the subject invention provides methods for making articles which have precisely controlled characteristics, including size, shape, hardness, and color. Particularly advantageous, the methods of the subject invention allow the production of a polyurethane object with a polyurethane integral skin which surrounds an inner structure. This integral skin is waterproof and can embody detailed features, for example, emblems.

In a preferred embodiment, the procedures of the subject invention can be used to produce an article comprising a soft polyurethane integral skin which is attached to a polyurethane foam inner structure. The procedures of the subject invention are particularly advantageous because the polyurethane integral skin layer is securely attached to the inner structure, without the need for adhesives, to produce a product which maintains its integrity and has no outer layer separation. In addition, the methods of the subject invention allow the production of polyurethane objects which manifest the detailed features of a master part, such as a seat cushion. The methods of the subject invention are also advantageous because these methods make it possible to make high quality, polyurethane covered articles quickly and easily without great expense.

In a specific embodiment of the subject invention, an article can be made which comprises a soft, textured, rugged outer polyurethane layer, referred to herein as an integral skin, encapsulating a polyurethane foam which typically makes up the structural component of the article. In this embodiment, an object desired to be reproduced in form and size can act as a master part. The master part has all of the features and surface topography which is desired of the ultimate finished product. The method of the subject invention is highly advantageous because the products which can be mass-produced by this process possess all of the external features of the master part. The high fidelity of this process is particularly unexpected in view of the low overall cost of the mold and the process which produces the finished article.

Using the master part, a mold is formed. In a preferred embodiment, the mold is made of silicone and has a rigid mother mold made of, for example, fiberglass and epoxy surrounding the silicone mold for structural support. Silicones for use in making such molds are well known and readily available. Typically, a two-component mold-making silicone will be used. Other materials with suitable properties can also be used to produce a mold.

In one embodiment, the silicone mold can be made to surround the entire master article. Thus, to remove the article, the mold can be partitioned and a portion removed to facilitate removal of the master article. The portion of the mold which is removed is referred to herein as a lid.

In an alternative embodiment of the subject invention, the mold and lid are prepared in separate steps. For example, in a first step, the master part can be placed in an appropriate container, such as a wooden box, and rest on a mound of clay. Liquid silicone can be added to surround all but the portion of the master part in contact with the clay. Once the silicone mold hardens, the master part with the silicone mold still attached can be turned upside-down, the clay removed, and additional liquid silicone poured onto the exposed surface of the master part, to produce a silicone lid epoxy which mates with the silicone mold. Once the silicone lid hardens, the lid can be removed and the master part removed from the mold. Alternatively, the lid can comprise aluminum epoxy, for example 80% aluminum powder and 20% epoxy resin. The lid can comprise any material which can take the shape of the exposed surface of the master part and provide sufficient structural support to contain the material used as the inner support of the object to be produced.

In a preferred embodiment of the subject invention, a pair of mother molds are produced to house the silicone mold and lid comprising, for example, silicone. The mother molds are made from, for example, fiberglass and epoxy and provide structural support to the silicone mold and lid. This structural support provides smaller production tolerances for the final product polyurethane objects. Specifically, the fiberglass and epoxy mother molds hold the silicone mold and lid in place during the expansion of the polyurethane foam. This leads to greater accuracy and reproducibility of size in the produced objects. In addition, when the silicone molds wear, the mother molds allow easy production of additional silicone molds by reinserting the master part and pouring in new liquid silicone.

Once the silicone mold and lid are produced, by whatever method used, a first step of the subject method is to deposit polyurethane on the interior surface of the silicone mold. In a preferred embodiment, this layer of polyurethane is sprayed onto the surface of the mold and the edge of the mold. This first layer of polyurethane will fill the crevices defining the detailed features of the master part and once hardened will retain these detailed features. This first layer of polyurethane can then be used to cover, for example a piece of bun stock, and attach to a structural support such as a piece of wood. The bun stock can be sculpted to approximate the shape of the master part. Another material which can be utilized to provide inner structure is Ethafoam produced by Dow Chemical. Other materials can also be used. Once the first layer is positioned over the inner structure, a second layer of polyurethane can be deposited on the exposed surface of the inner structure such as to contact the first layer whereby a seal is made between first and second layers.

In a preferred embodiment, once the first polyurethane layer has solidified, polyurethane foam, for example high resilient, structural, or rigid, is deposited in the polyurethane lined mold and the lid is place over the foam to create a cavity which the polyurethane foam can expand to fill. Examples of other materials which can be deposited into the mold include any pourable liquid plastics, as well as any other materials with suitable properties. Specifically, when the lid is applied, there is a cavity above the polyurethane foam and first polyurethane layer, which corresponds to the volume which is to be occupied by the expanded polyurethane foam. If the mold and/or lid has regions where air can be trapped during the expansion of the foam, apertures can be introduced in the mold and/or lid to vent the air during the foam expansion. The lid can be produced to cover the edge of the mold to prevent the foam from attaching to the mold edge. In a preferred embodiment, the lid is rigid enough and held in place with sufficient force to prevent foam from seeping into the contact between the lid and the edge of the mold.

Once the polyurethane foam has solidified, the lid can be removed. At this point, a second polyurethane layer can be applied to the exposed surface of the polyurethane foam such as to fully cover the surface of the foam and to contact the first polyurethane layer in such a way as to create a seal between the first and second layers, forming an integral skin covering the foam. The methods of the subject invention are particularly advantageous because they can allow the second layer of polyurethane to be deposited such as to contact the first layer at the point of contact between the first layer and the edge of the foam, creating a seam which is waterproof and durable. Once the second polyurethane layer has solidified, the fully finished object can be removed from the mold. The seam created at the connection of the first and second polyurethane layers can be pruned. Alternatively, the object can be demolded prior to applying second layer. For example, the second layer can be sprayed on multiple objects in assembly line fashion.

In another embodiment, a mold release compound such as FREKOTE 1711 I, obtainable from Dexter Corporation, Dexter Drive, Book, N.H. 03874, can be applied to the internal surface of the mold prior to the formation of the first polyurethane layer. A further aspect of a preferred embodiment of the subject invention is the absence of any mold release compound applied to the lid. It has been found that, surprisingly, the lid can readily be removed without the need for a mold release compound. Thus, the second polyurethane layer can then be applied directly to the surface of the polyurethane foam without the presence of any residual mold release compound.

A variety of polyurethanes can be used in the practice of the subject invention. As would be appreciated by those skilled in the art, polyurethanes can be purchased as two-component systems. Upon mixing of the two components, a chemical reaction is initiated whereby the product having the desired physical characteristics is formed. The physical characteristics of the polyurethane product are, of course, dictated by the specific chemical composition. The components of polyurethanes are typically called the "A" component and the "B" component is typically a polyol. These components are readily available with instructions for use from suppliers such as Universal Polymers Corporation, 1122 W. Carrier Parkway, Grand Prairie, Tex. 75050; and Urethane Technologies, 40 Enterprise Boulevard, Atlanta, Ga. 30336.

A wide variety of modifications can be made to the process of the subject invention without departing from the spirit of the general process described here. For example, a paint can be applied to the internal surface of the mold prior to the deposition of the first polyurethane layer. In a preferred embodiment, the paint will be an acrylic or other water-based paint.

An additional optional variation is the insertion of fastening devices into the article. Typically, these fastening devices will be embedded in the polyurethane foam of the article. To embed the fasteners in the foam, the fasteners can be inserted into holes drilled into the lid, whereby the fasteners are held in position by the lid until the foam expands around them and solidifies. When the lid is removed, the fasteners stay embedded in the foam. The second layer of polyurethane can be sprayed such that a seal is made around the fasteners at the point of contact with the surface of the foam. In a preferred embodiment, the portion of the fasteners extending out of the foam are covered with, for example, masking tape prior to applying the second layer of polyurethane. Accordingly, once the second layer is applied, the tape is removed. The fastening devices may be any such appropriate device known to those skilled in the art and would include, for example, plastic fasteners, snaps, velcro, and/or metal fasteners.

In addition to the process described herein, the subject invention concerns products produced by this unique process. These products have an outer layer of polyurethane encapsulating an inner structure for example made of polyurethane foam, wherein the layer strongly adheres directly the polyurethane foam inner structure with no adhesive used between the layer and the foam. The strength of the connection between the layer and the foam is enhanced by the absence of any mold release compound.

Following are examples which illustrate procedures for practicing the invention. These examples should not be construed as limiting. All percentages are by weight and all solvent mixture proportions are by volume unless otherwise noted.

EXAMPLE 1

Production of Polyurethane Article

A specific embodiment of the method of the subject invention is shown in the Figures. These figures show a cross-section of the items used and made according to the subject invention.

Figure 1A:
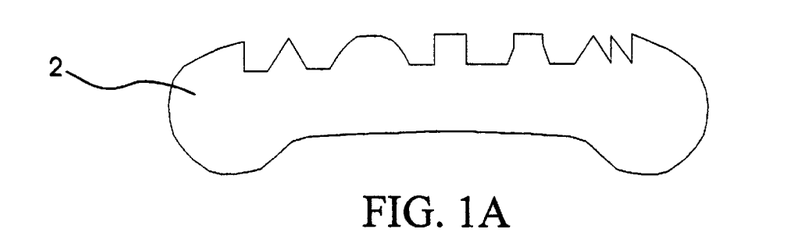
FIG. 1A shows a cross-section of the master part.
Figure 1B:
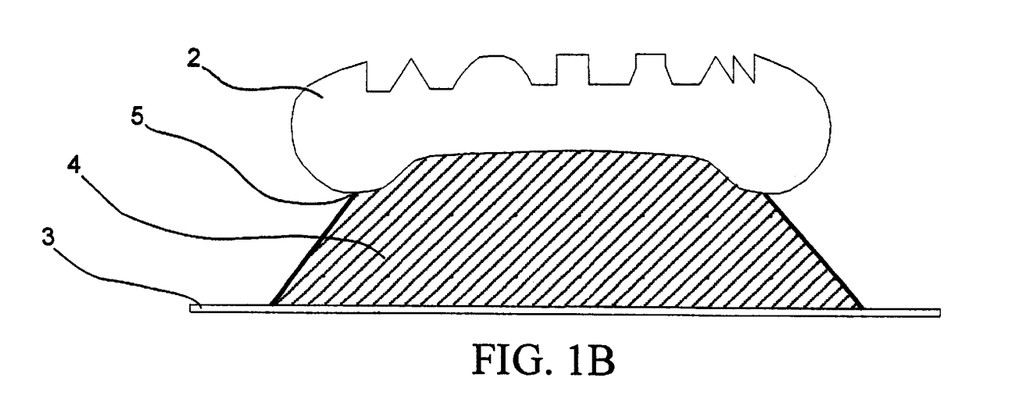
FIG. 1B shows the master part on top a clay mound which is on a platform.
Figure 2A:
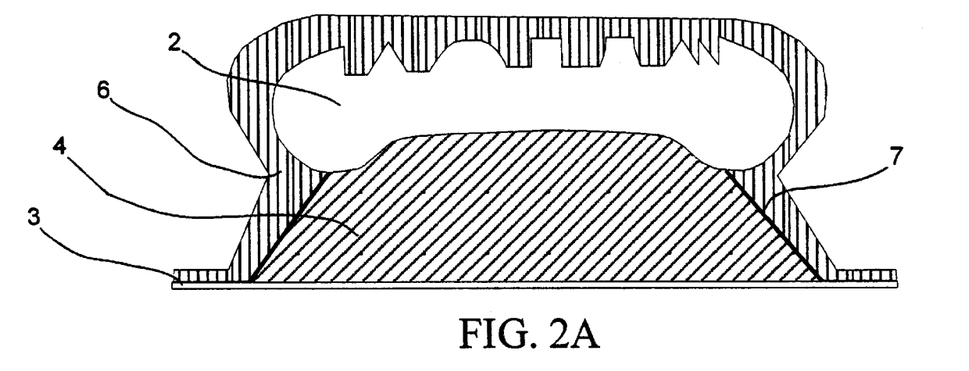
FIG. 2A shows the addition of a layer of clay around the master part.

First, a master part 2 is prepared having the exact shape, size, and surface topography of the desired article. FIG. 1A shows a cross-section of the master part 2. Referring to FIG. 1B, master part 2 is then placed on top of a mound of clay 4 which rests on a platform 3, for example a piece of wood, with the top portion of master part 2 facing up. In a specific embodiment, a mineral based "clean" clay is used. The bottom portion of master part 2 is in contact with clay mound 4 such that the edge of clay mound 4 defines a contour 5 on master part 2, where the first and second polyurethane layers will meet to form a seam. The exact location of this seam is a matter of design choice and should take into account the location of the detailed topography of master part 2 to be reproduced and the ease of removing the object from the mold. In a specific embodiment clay mound 4 makes an approximately 30 to 45 degree angle with an axis normal to platform 3. Referring to FIG. 2A, layer of clay 6, for example rollable clay, is then used to cover the top portion of master part 2 and the exposed portion 7 of clay mound 4. Preferably, this layer of clay is about ½ inch thick. Prior to covering exposed portion 7 of clay mound 4, a barrier material, for example a piece of polybag, can be positioned between exposed portion 7 and layer of clay 6, to ensure the ability to remove layer of clay 6 without disturbing clay mound 4.

Figure 2B:
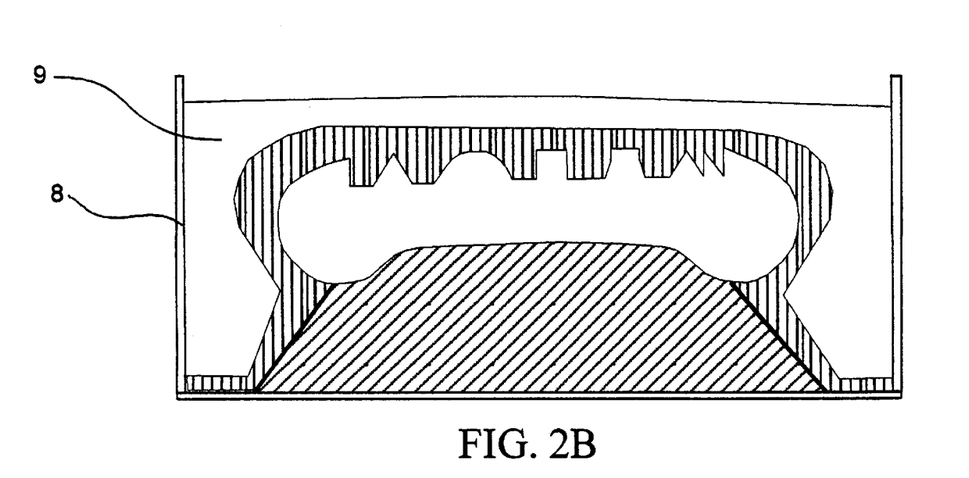
FIG. 2B shows the production of the first mother mold.

Once master part 2 is surrounded by clay, a retaining wall 8 is built up from platform 3 as shown in FIG. 2B. A mother mold 9 is then formed of epoxy and fiberglass, or other suitable material, by covering clay layer 6 and the exposed portion of platform 3 with the appropriate mold material. It is preferred to wax the inside of retainer wall 8 and the exposed portion of platform 3 to ease separation from mother mold 9. Once mother mold 9 hardens, it can be removed and then sanded and/or polished as desired.

Figure 3A:
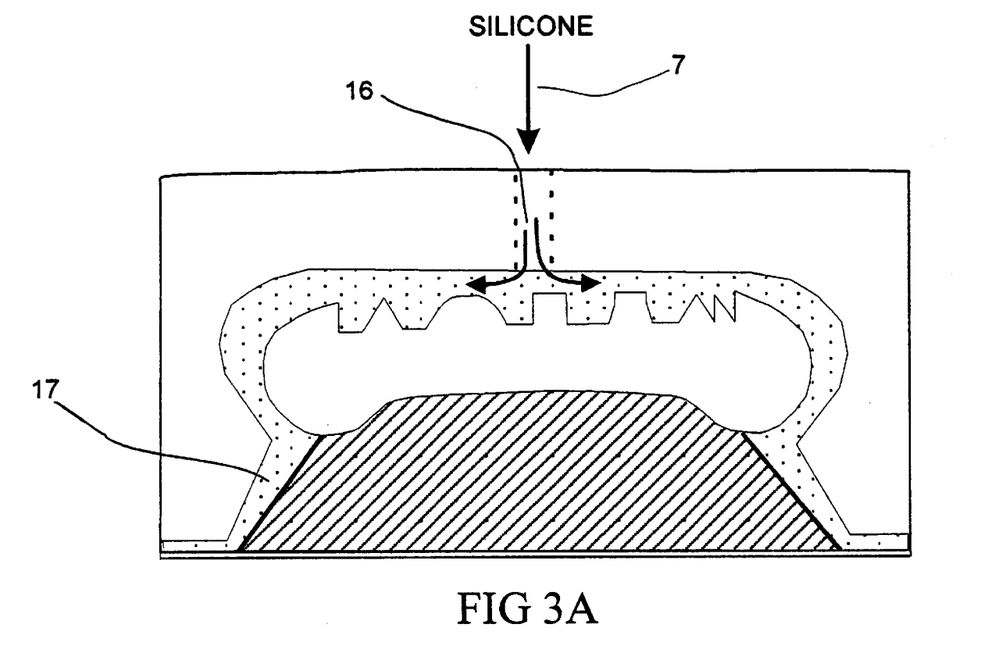
FIG. 3A shows the production of the silicone mold.
Figure 3B:
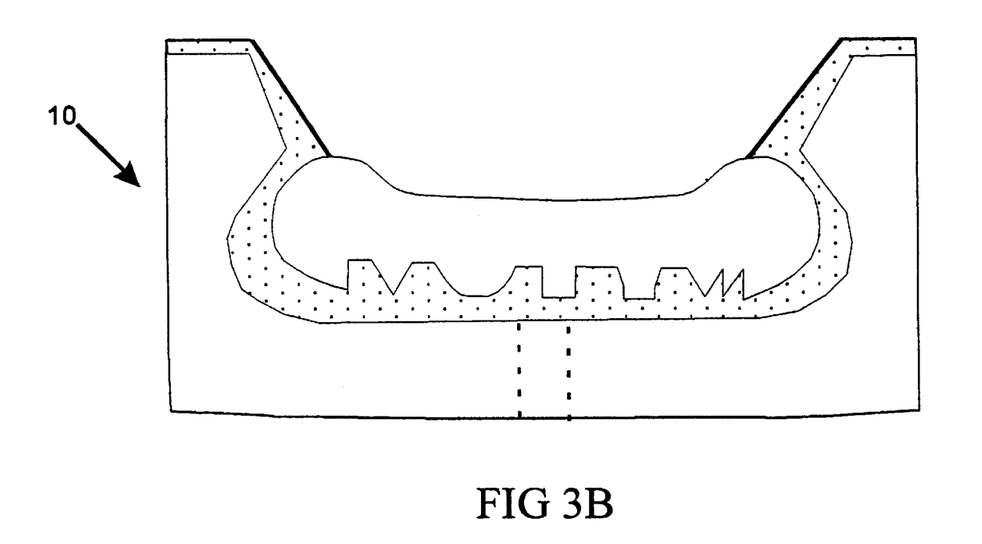
FIG. 3B shows the inversion of the mold assembly and removal of the platform and clay mound.

Retaining wall 8 is removed and mother mold 9 is lifted off of clay layer 6. Clay layer 6 is then removed, leaving master part 2 resting on clay mound 4. A hole 16, for example a ¾ inch hole, can be drilled through mother mold 9, preferably near the top. As shown in FIG. 3A, mother mold 9 is placed back over master part 2 resting on clay mound 4, leaving an air pocket where clay layer 6 used to be. Liquid silicone 7 is then poured into this air pocket through hole 16 in mother mold 9. The hardened silicone mold 17 will have all the detailed features of the top portion of master part 2. Referring to FIG. 3B, the entire mold assembly 10 is turned upside-down, platform 3 is removed, and then clay mound 4 is removed.

Figure 4A:
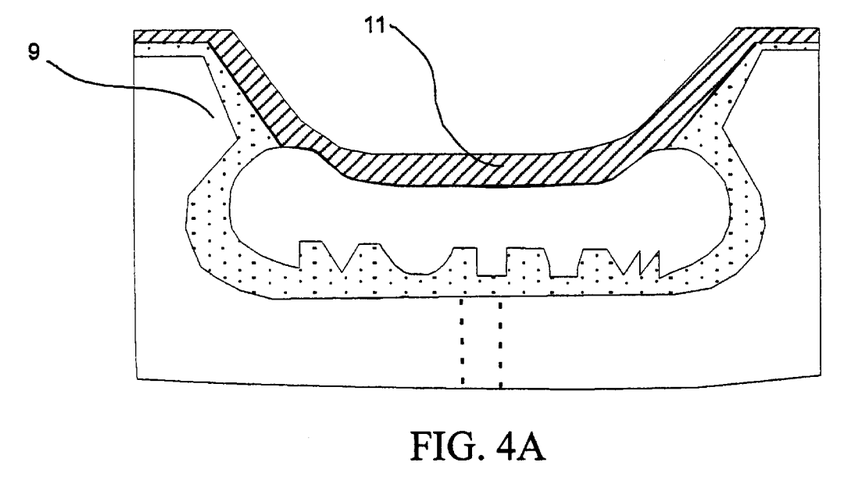
FIG. 4A shows the addition of a second clay layer around the master part.
Figure 4B:
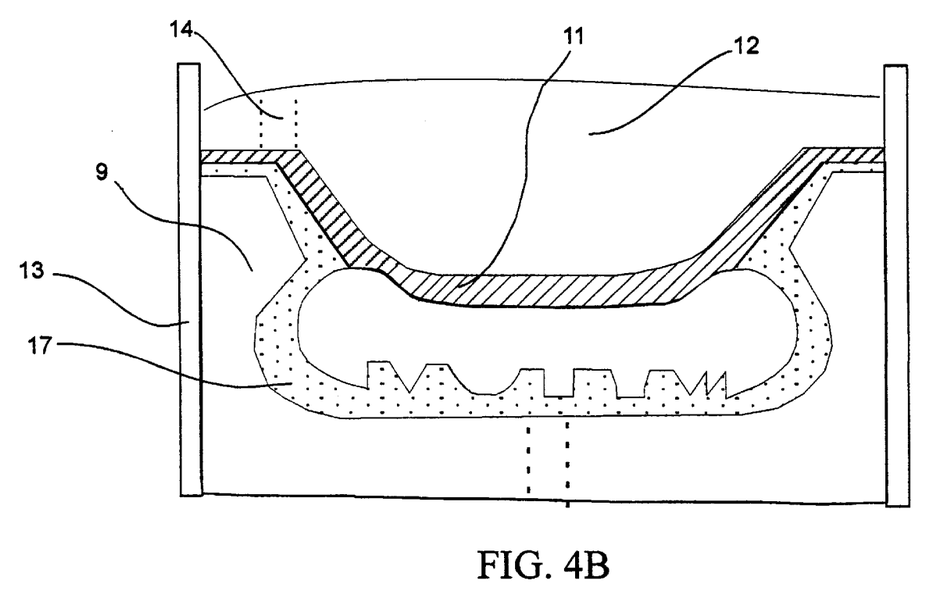
FIG. 4B shows the production of the second mother mold.

A second clay layer 11 is then laid on the bottom portion of master part 2 and the exposed portion of silicone mold 17. This is shown in FIG. 4A. A second mother mold 12 is produced by building a second retaining wall 13, laying epoxy and fiberglass, or other suitable material, on the second clay layer 11 and exposed portion of mother mold 9, and letting the suitable material harden. This is illustrated in FIG. 4B. Again, waxing retainer wall 13 and first mother mold 9 allows easier separation of second mother mold 12.

Figure 5A:
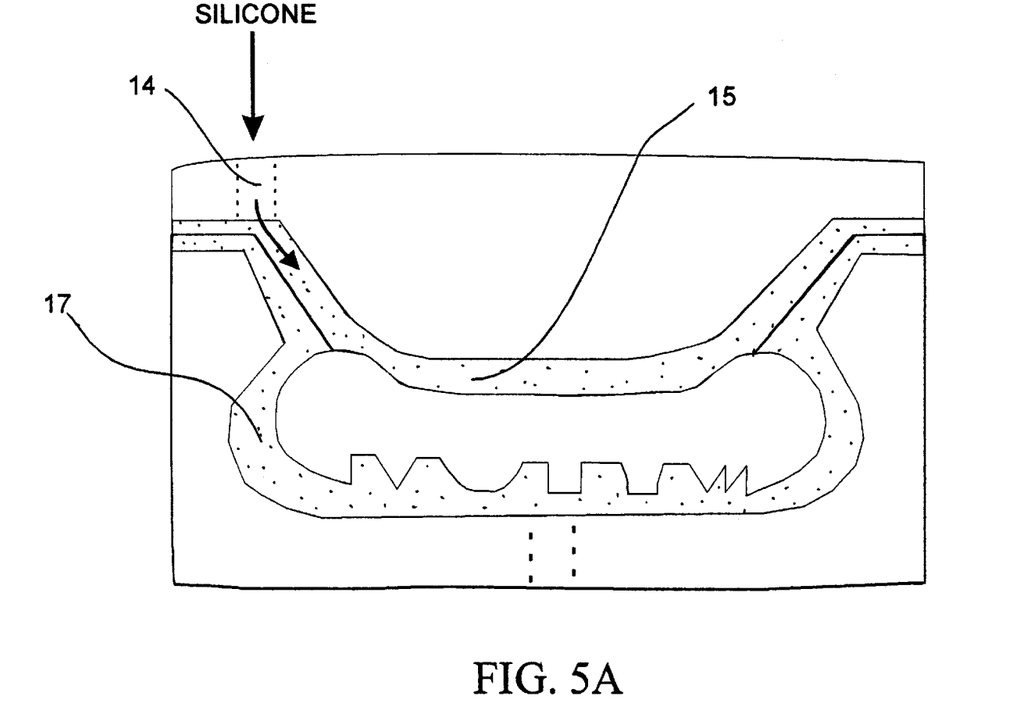
FIG. 5A shows the production of the silicone lid.

Second mother mold 12 is removed, second layer of clay 11 is removed, and a hole 14 is drilled through second mother mold 12. Referring to FIG. 5A, second mother mold 12 is positioned over master part 2 and liquid silicone or aluminum epoxy is poured through hole 14 into the air pocket left when clay layer 11 was removed, to form silicone lid 15. Accordingly, mold 17 and lid 15, housed within mother molds 9 and 12 respectively, can be used to manufacture polyurethane objects according to the subject invention.

Figure 5B:
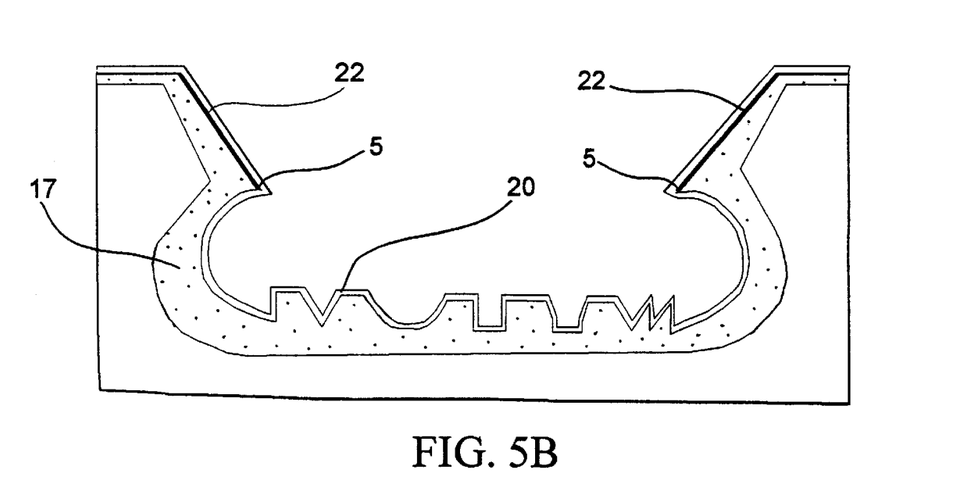
FIG. 5B shows the deposition of the first layer of polyurethane.

Referring to FIG. 5B, once mold 17 and lid 15 are made, the next step in the production of polyurethane objects according to the subject invention is to deposit a first layer 20 of polyurethane to the surface of mold 17 which comprises the detailed features of the master part. This first layer 20 should extend onto the edge 22 of mold 17, preferably along the entire beveled edge 22 of mold 17. First layer 20 will manifest the detailed features of master part 2.

Figure 6A:
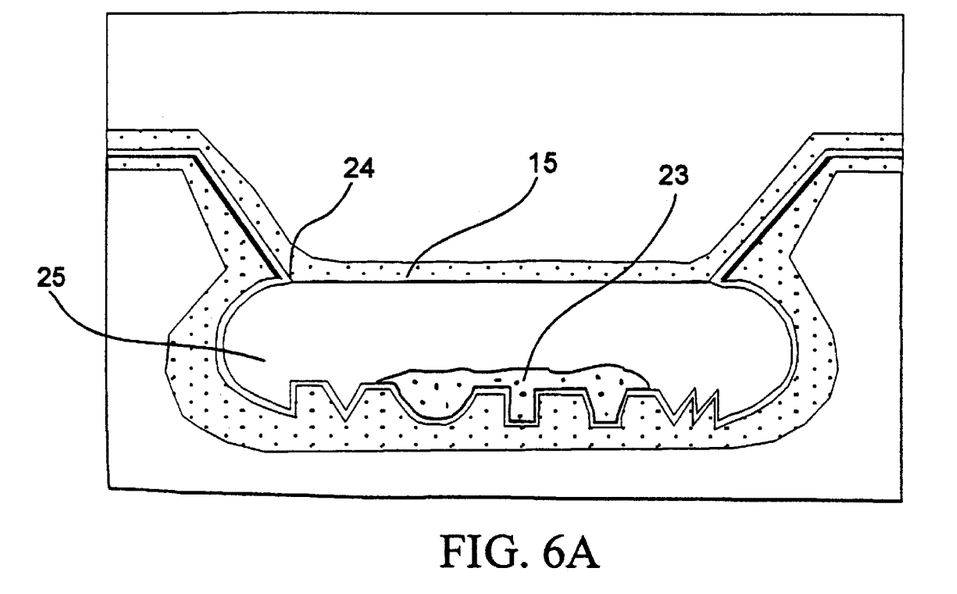
FIG. 6A shows the introduction of polyurethane foam and the application of the lid.

Once first layer 20 has dried, polyurethane foam 23 is deposited into the polyurethane-lined mold 17. Lid 15 is then placed over the foam 23 and held in place with sufficient force to prevent the foam, upon expansion, from seeping between the contacting surfaces 24 of lid 15 and first layer 20. This is shown in FIG. 6A. The polyurethane foam 23 expands to fill the cavity 25 created between lid 15 and first layer 20. If the contour of lid 15 or mold 17 would lead to the development of air pockets upon expansion of foam 23, holes can be drilled to prevent such trapping.

Figure 6B:
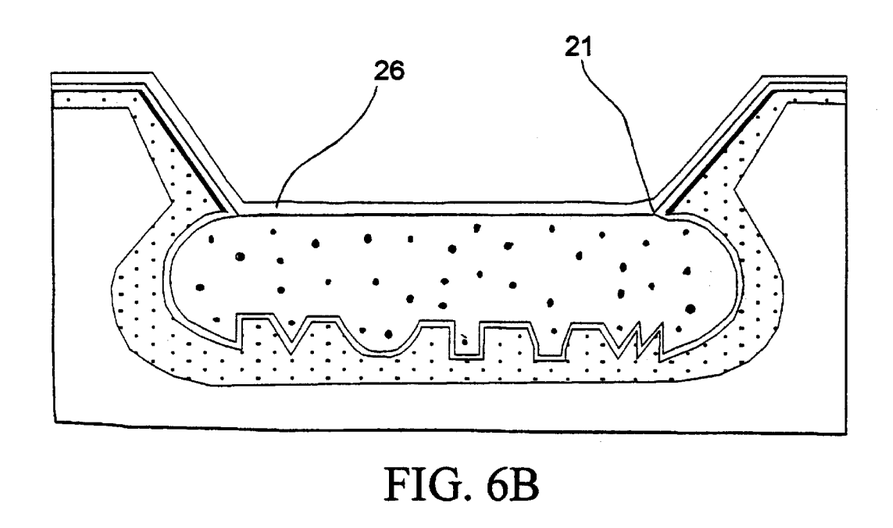
FIG. 6B shows the deposition of the second layer of polyurethane.

Referring to FIG. 6B, once the foam has set, lid 15 is removed and a second layer 26 of polyurethane is deposited on the exposed surface of the foam and the exposed portion of first layer 20. It is important for second layer 26 and first layer 20 to be in continuous contact along the location of seam 21, which coincides with contour 5 of master part 2. It is preferred for second layer 26 and first layer 20 to be in contact along the entire length corresponding to beveled edge 22 in order to facilitate the pruning of seam 21 formed by the union of first and second layers 20, 26.

If it is desired to paint the polyurethane object produced by the methods of the subject invention, it is preferred to deposit paint on the surface of mold 17 prior to depositing first layer 20. In addition, to completely paint the object, paint can be deposited on top of second layer 26 after second layer 26 dries. Alternatively, the polyurethane object can be completely painted after removal from mold 17.

It should be understood that the examples and embodiments described herein are for illustrative purposes only and that various modifications or changes in light thereof will be suggested to persons skilled in the art and are to be included within the spirit and purview of this application and the scope of the appended claims.

I claim:

1. A method for producing a molded article comprising a polyurethane integral skin layer wherein said method comprises preparing a mold and a lid wherein said mold defines the size, shape, and surface topography of the molded article, wherein said method further comprises:

(a) applying a first layer of polyurethane to an inner surface of said mold wherein said inner surface of said mold defines the size, shape, and surface topography of the molded article;

(b) depositing polyurethane foam into said mold;

(c) covering the mold with a lid, wherein said mold and said lid define a cavity;

(d) allowing the polyurethane foam to rise and fill the cavity defined by the polyurethane lined mold and said lid;

(e) removing said lid to expose a portion of the surface of said foam; and (f) applying a second layer of polyurethane to said exposed surface of the foam, wherein said second layer of polyurethane can be applied after said first layer of polyurethane has solidified, and wherein said second layer of polyurethane forms a seam with said first layer of polyurethane to produce a molded article comprising a polyurethane integral skin layer.

2. The method according to claim 1, wherein prior to the step of applying a first layer of polyurethane to the surface of the mold, said method further comprises applying paint to the surface of the mold.

3. The method according to claim 2, wherein the step of applying paint to the surface of the mold comprises spraying said paint.

4. The method according to claim 1, wherein said mold comprises a beveled edge.

5. The method according to claim 4, wherein said lid covers the edge of the mold to prevent the foam from attaching to the mold edge.

6. The method according to claim 4, wherein the step of applying a first layer of polyurethane to the surface of the mold further comprises applying said first layer to said beveled edge.

7. The method according to claim 1, wherein said polyurethane foam is a high resilient polyurethane foam.

8. The method according to claim 1, wherein the step of covering the polyurethane lined mold with a lid further comprises holding said lid in place.

9. The method according to claim 1, wherein the step of applying a first layer of polyurethane comprises spraying said polyurethane.

10. The method according to claim 1, wherein at least one aperture is introduced in the mold or lid, or both, to vent air during the foam expansion.

11. The method according to claim 10, wherein the lid is rigid enough and held in place with sufficient force to prevent foam from seeping into the contact between the lid and the edge of the mold.

12. A method for producing a molded article comprising a polyurethane integral skin layer wherein said method comprises preparing a mold wherein said mold defines the size, shape, and surface topography of the molded article, wherein said method further comprises:

a) applying a first layer of polyurethane to an inner surface of said mold wherein said inner surface of said mold defines the size, shape, and surface topography of the molded article;

b) depositing an inner structure into said polyurethane lined mold, wherein said inner structure comprises polyurethane foam;

c) covering the mold with a lid;

d) allowing the polyurethane foam to rise and fill the cavity defined by the polyurethane lined mold and lid;

e) removing the lid; and f) applying a second layer of polyurethane to an exposed surface of said inner structure, wherein said second layer of polyurethane can be applied after said first layer of polyurethane has solidified, and wherein said second layer of polyurethane forms a seam with said first layer of polyurethane to produce a molded article comprising a polyurethane integral skin layer, wherein said lid comprises at least one fastener removably attached such that when said polyurethane foam rises to fill the cavity the foam attaches to said fastener and wherein when the lid is removed said fastener is held by the foam such that after the second layer of polyurethane is applied the molded article comprises at least one fastener securely attached.

13. The method according to claim 12, wherein prior to the step of applying the layer of polyurethane to the surface of the mold, said method further comprises applying paint to the surface of the mold.

14. The method according to claim 13, wherein the step of applying paint to the surface of the mold comprises spraying said paint.

15. The method according to claim 12, wherein said mold comprises a beveled edge.

16. The method according to claim 15, wherein the step of applying the layer of polyurethane to the surface of the mold further comprises applying said layer to said beveled edge.

17. The method according to claim 12, wherein the step of applying the layer of polyurethane comprises spraying said polyurethane.

* * * * *